United States Patent [19]

Koral et al.

[11] 4,342,482

[45] Aug. 3, 1982

[54] SLIDING SUNROOF WITH VENTILATOR

[75] Inventors: Joseph F. Koral, Sterling Heights; Karl S. Shargabian, Troy; Ervin H. Strem, Jr., Utica, all of Mich.

[73] Assignee: General Motors Corporation, Detroit, Mich.

[21] Appl. No.: 200,924

[22] Filed: Oct. 27, 1980

[51] Int. Cl.³ .............................................. B60J 7/04
[52] U.S. Cl. .................................................... 296/221
[58] Field of Search ............................... 296/221, 222

[56] References Cited

U.S. PATENT DOCUMENTS

| | | | |
|---|---|---|---|
| 3,329,462 | 7/1967 | Baur | 296/222 |
| 3,507,537 | 4/1970 | Kouth et al. | 296/221 |
| 3,981,531 | 9/1976 | Koral et al. | 296/221 |
| 4,085,965 | 4/1978 | Schlapp | 296/221 |
| 4,154,474 | 5/1979 | Hough et al. | 296/218 |

Primary Examiner—Robert R. Song
Attorney, Agent, or Firm—Charles E. Leahy

[57] ABSTRACT

A vehicle body sunroof includes a vehicle body roof panel having a roof opening defined by a downward facing flange of the roof panel. A rectangular carrier frame, preferably of plastic construction, has an outer peripheral edge portion which underlies the downward facing body flange and an inner peripheral edge portion which faces upwardly into the roof opening and defines a sunroof opening in the carrier frame. A roof panel seal is mounted on the outer portion of the carrier frame and is adapted for vertically compressed sealing engagement with the downward facing body flange. A closure panel, preferably of glass, is smaller than the roof panel opening and has a peripheral edge portion adapted to overlie the inner portion of the carrier frame in sealing engagement with a closure panel seal mounted on the inner portion of the carrier frame. One end of the closure panel is connected to the carrier frame by a hinge and the other end is connected by a toggle linkage which selectively pivots the closure panel to a pivotally raised ventilator position or latches the closure panel in a closed position vertically compressing the closure panel seal. An operating mechanism including a track mounted on the body beneath the roof panel moves the carrier frame between a vertically raised closed position vertically compressing the seal vertically against the downward facing body flange and a stored position moved longitudinally of the roof opening so that the roof opening is opened for air communication with the outdoors.

4 Claims, 6 Drawing Figures

SLIDING SUNROOF WITH VENTILATOR

The invention relates to a vehicle body sunroof and more particularly provides a sunroof construction in which the sunroof closure is movable longitudinally of a roof opening to selectively open and close the roof opening and in which the closure panel is pivoted upward from the closed position to a ventilating position.

BACKGROUND OF THE INVENTION

It is well known to provide a vehicle body roof panel having a roof opening which is selectively opened and closed by a metal or glass closure panel. Such closure panels are conventionally operated by a track assembly which moves the closure panel fore and aft between a closed position and an open position.

A preferred closure panel operating mechanism disclosed in U.S. Pat. No. 3,981,531, Koral et al, issued Sept. 21, 1976, raises the closure panel vertically against a downwardly facing roof flange defining the roof opening so that a seal is vertically compressed between the closure panel and the flange to provide a water-tight occupant compartment.

Another type of prior art sunroof provides a closure panel operating mechanism which pivotally raises the rear portion of the closure panel from the closed position to a ventilator position as well as bodily moving the closure panel fore and aft between open and closed positions. A shortcoming of the sliding sunroof ventilator construction is the difficulty of providing a watertight seal between the closure panel and the roof panel edges while still permitting articulation of the closure panel between the ventilator position, the closed position, and the open position. Accordingly, a water channel and drain tubes are employed to capture and dispose of water which leaks past the seal.

It would be desirable to provide a vehicle body sunroof construction in which a vertically compressed seal is employed for optimum water tightness and yet the sunroof closure panel can be raised and lowered above and below the sunroof panel as desired to establish the sunroof panel in either an angularly raised venting position, a closed position sealed to the roof panel or a longitudinally retracted open position.

A vehicle body sunroof according to this invention includes a vehicle body roof panel having a roof opening defined by a downward facing flange of the roof panel. A rectangular carrier frame, preferably of molded plastic, has an outer peripheral edge portion which underlies the downward facing body flange and an inner peripheral edge portion which faces upwardly into the roof opening and defines a sunroof opening in the carrier frame. A roof panel seal is mounted on the outer portion of the carrier frame and is adapted for vertically compressed sealing engagement with the downward facing body flange. A closure panel, preferably of glass, is smaller than the roof panel opening and has a peripheral edge portion adapted to overlie the inner portion of the carrier frame in sealing engagement with a closure panel seal mounted on the inner portion of the carrier frame. One end of the closure panel is connected to the carrier frame by a hinge and the other end is connected by a toggle linkage which selectively pivots the closure panel to a pivotally raised ventilator position or latches the closure panel in a closed position vertically compressing the closure panel seal. An operating mechanism including a track mounted on the body beneath the roof panel moves the carrier frame between a vertically raised closed position vertically compressing the seal vertically against the downward facing body flange and a stored position moved longitudinally of the roof opening so that the roof opening is opened for air communication with the outdoors.

The object, feature, and advantage of the invention resides in a sunroof carrier frame which seals against the underside of the vehicle body roof panel around the roof opening and a closure panel pivotally mounted on the carrier frame for movement between an angularly open ventilating position above the roof panel and a closed position in which the carrier frame and closure panel may be moved below and longitudinally of the roof opening to open the roof opening.

Another object, feature, and advantage of the invention resides in the provision of a sunroof carrier frame mounted for fore and aft sliding movement between open and closed positions and carrying an outer peripheral seal adapted for vertical compressive engagement with the roof panel around the roof panel opening and an inner peripheral seal portion adapted for compressing sealing engagement by a sunroof closure panel selectively movable between a closed position and an angularly raised ventilating position.

BRIEF DESCRIPTION OF THE DRAWINGS

These and other features, objects, and advantages of the invention will become more apparent upon consideration of the specification and the appended drawings in which.

DESCRIPTION OF THE PREFERRED EMBODIMENT

Figure 1:
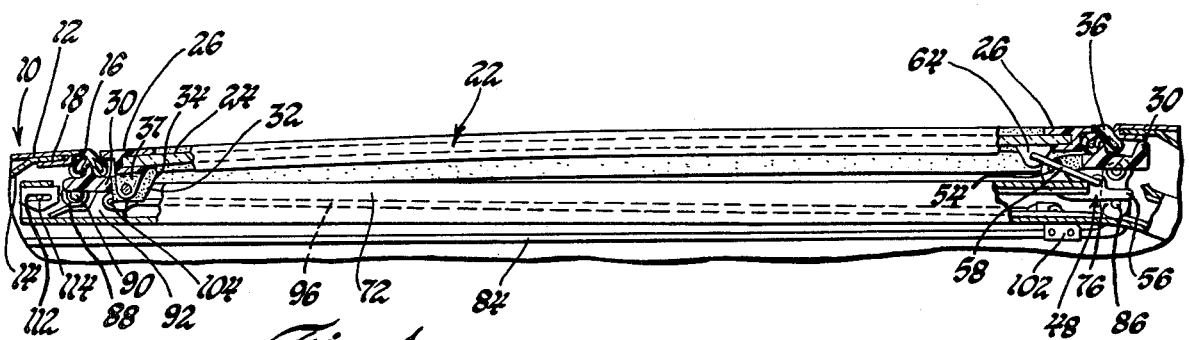
FIG. 1 is a sectional side elevation view of a vehicle roof showing the sunroof closure in the closed position.
Figure 2:
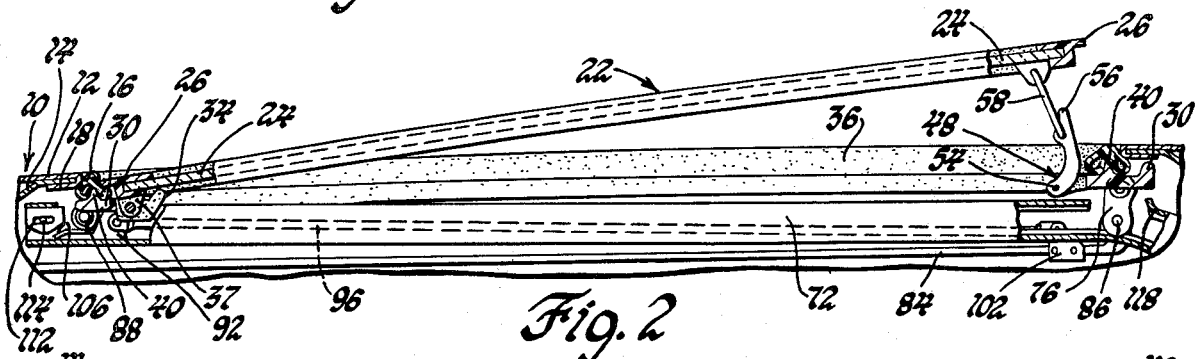
FIG. 2 is a view similar to FIG. 1 but showing the closure panel angularly raised to a ventilating position.

Referring to FIG. 1 a vehicle body roof structure indicated generally at 10 includes an outer panel 12 and an inner panel 14. A roof opening 16 is provided by a flange 18 of the outer panel 12 which is folded over the inner panel 14 and faces downwardly into the vehicle passenger compartment.

A closure panel 22 comprised of a tinted glass panel 24 framed by a perimeter channel 26 is slightly smaller than the size of the roof opening 16 and is mounted on a carrier frame 30. The carrier frame 30, preferably of molded plastic construction, has an outside dimension greater than the roof opening 16 so that it underlies the roof flange 18. The carrier frame 30 also has an inner wall 32 which defines a sunroof opening 34 smaller than the closure panel 22 so that the carrier frame 30 also underlies the perimeter channel 26.

Figure 5:
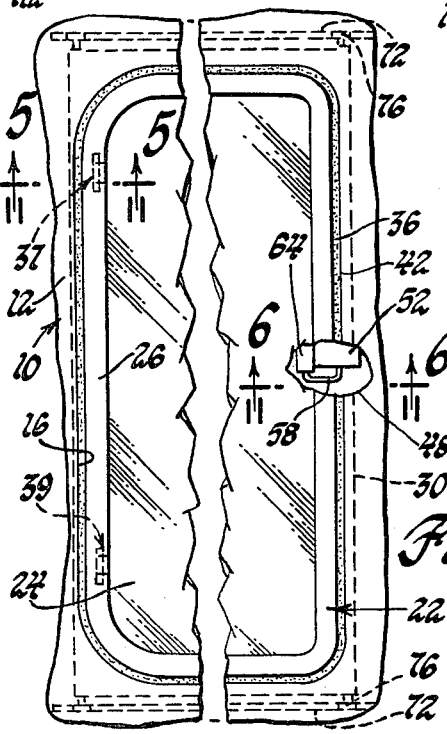
FIG. 5 is an enlarged fragmentary view corresponding to FIG. 1 and showing a section through one of a pair of hinges which mount the forward end of the closure panel on the sunroof carrier frame.
Figure 6:
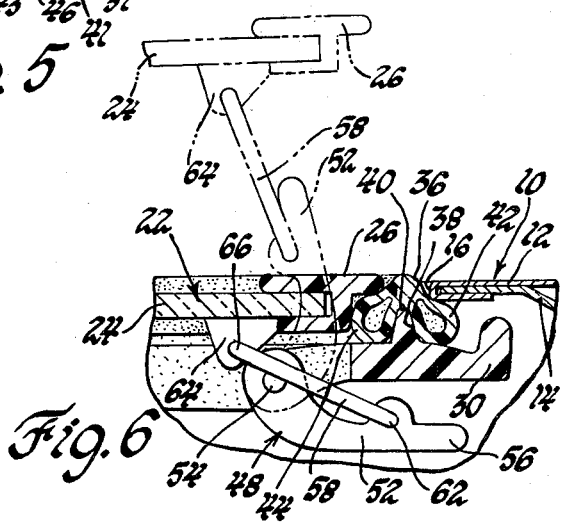
FIG. 6 is an enlarged fragmentary view corresponding to FIG. 1 and showing a toggle linkage which raises the rear end of the closure panel upwardly to a ventiliating position.

As best seen in FIGS. 5 and 6, a seal 36 is mounted on the carrier frame 30 and has a recess 38 which fits over an upstanding ridge 40 molded integral with the carrier frame 30. The seal 36 includes an outer peripheral seal portion 42 which is adapted for vertical compression between the roof flange 18 and the underlying portion of the carrier frame 30. Seal 36 also has an inner peripheral seal portion 44 which is adapted for vertical compression between the closure panel perimeter channel 26 and the underlying portion of the carrier frame 30.

Figure 4:
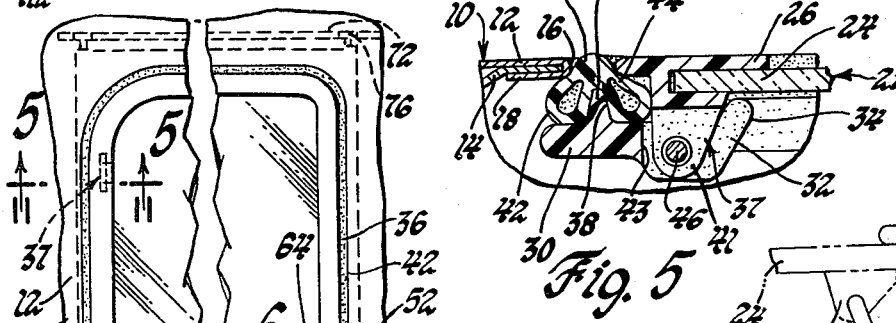
FIG. 4 is a plan view of the vehicle body roof and sunroof.

Referring to FIGS. 4 and 5, it is seen that a pair of hinge assemblies 37 and 39 act between the perimeter channel 26 and the carrier frame 30. Each of the hinge assemblies includes an integral projection 41 of the perimeter channel 26 which extends into a recess 43 provided in the carrier frame 30. A hinge pin 46 extends between the projection 41 and the carrier frame 30 to provide a hinge axis.

Referring to FIG. 6, a toggle linkage, generally indicated at 48, is provided to move the closure panel 22 between the solid line indicated closed position and a phantom line indicated angularly raised open position. The toggle linkage 48 includes a handle link 52 having its one end connected to the carrier frame 30 by a pivot pin 54 and its opposite end providing a hand grip 56 for the vehicle occupant. The toggle linkage 48 also includes a toggle link 58 which has its one end pivotally connected to the handle link 52 at a pivot 62 and its other end pivotally connected to a projection 64 on the perimeter channel 26 by a pivot 66.

Pivotal movement of the handle link 52 in the opening direction is stopped at the phantom line indicated position of FIG. 6 in which the pivot 62 is overcenter with respect to the pivot 66 and pivot pin 54 so that the toggle linkage 48 retains the closure panel 22 in the open position to ventilate the occupant compartment. The closure panel 22 is returned to the closed position by return of the toggle linkage 48 to the solid line indicated position of FIG. 6 in which the toggle link 58 is overcenter with respect to the pivot pin 54 so that the closure panel 22 is latched in the closed position and the inner peripheral seal portion 44 is vertically compressed in water tight sealing engagement between the carrier frame 30 and the perimeter channel 26.

Referring again to FIGS. 1 and 3, a sunroof closure operating mechanism is provided for moving the closure panel 22 and carrier frame 30 between the closed position of FIG. 1, the vertically lowered position of FIG. 3, and a rearwardly retracted full open position, not shown. The operating mechanism includes a pair of tracks which extend longitudinally of the vehicle along each side of the roof opening 16 and are conventionally attached to the vehicle body roof structure 10, for example, as shown in U.S. Pat. No. 4,159,144 issued June 29, 1979 to Ehlen et al.

Figure 3:
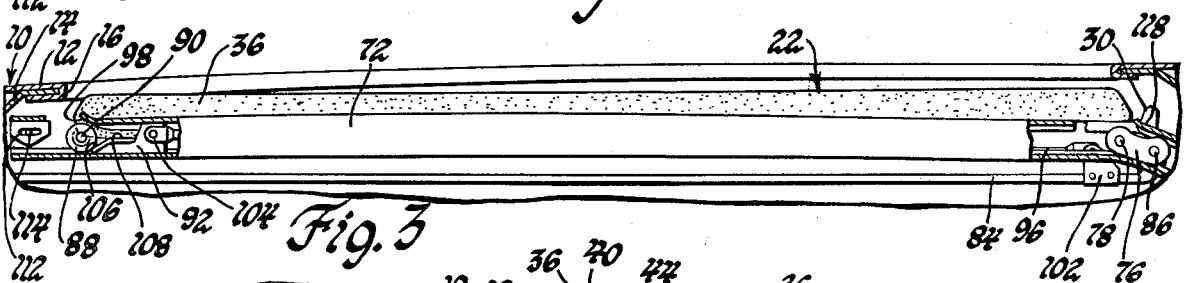
FIG. 3 is a view similar to FIGS. 1 and 2 but showing the sunroof closure vertically spaced from the roof panel and spaced somewhat rearwardly of its full forward position.

The drawings show only the track 72 extending along the driver's side of the roof opening 16, it being understood that an identical track and closure panel operating mechanism would be provided along the passenger side of the roof opening 16. Referring to FIGS. 1 and 3, it will be seen that the rearward end of the carrier frame 30 is operated by a lifter link 76 having its forward and upper end pivotally connected to the carrier frame 30 by a pivot 78 and suitable bracketry, not shown. The rearward and lower end of the lifter link 76 has a rounded configuration which slidably rides in the track 72 and is connected to a drive cable 84 by a pivot 86.

Referring again to FIGS. 1 and 3, it will be seen that the forward end of the carrier frame 30 is supported by a roller 88 which rides in the track 72 and is rotatably mounted on the carrier frame 30 by a shaft 90 and suitable mounting bracketry, not shown. The closure panel operating mechanism also includes a ramp member 92 which is slidably captured in the track 72 intermediate the roller 88 and the lifter link 76. As best seen in FIG. 1, the ramp member 92 is maintained at a fixed distance ahead of the rearward end of the lifter link 76 by a connecting rod 96 which is connected to the drive cable 84 by a bracket 102 and is connected to the ramp member 92 by a pivot 104. In the alternative, the ramp member 92 may be suitably connected directly to the drive cable 84. As best seen in FIG. 3, the ramp member 92 has an inclined surface 106 and a dwell surface 108. A stop member 112 is mounted in the track 72 and has an elongated slot which receives a bolt 114 to permit fore and aft adjusting movement of the stop member 112. The stop member 112 is engageable by the roller 88 to stop forward movement of the roller 88 and thus limit the forward movement of the carrier frame 30.

Referring to FIG. 1, it is seen that the length of the connecting rod 96 is such that when the sunroof is in the FIG. 1 closed position, the ramp member 92 is driven beneath the roller 88 to raise the roller 88 into an opening 98 in the top of the track 72 and hold the front end of the carrier frame 30 upwardly against the roof structure 10 while the lifter link 76 simultaneously obtains a generally upstanding position which holds the rear end of the carrier frame 30 against the roof structure 10. Accordingly, the outer peripheral seal portion 42 of the seal 36 is vertically compressed between the carrier frame 30 and the roof flange 18 all around the circumference of the roof opening 16.

Referring to FIG. 3, it will be understood that rearward motion imparted to the drive cable 84 by a suitable motor or hand crank mechanism, not shown, initiates a downward and rearward movement of the carrier frame 30 and closure panel 22 to a rearward position stored beneath the roof structure 10 to completely open the roof opening 16 for open air communication with the outdoors. As seen in FIG. 3, the initial rearward movement of the drive cable 84 causes the rearward end of the lifter link 76 to be withdrawn rearwardly so that the lifter link 76 engages a lip 118 on the track 38 and is collapsed to the horizontal position of FIG. 3. The track 38 is bent downwardly to facilitate entry of the lifter link 76 and accelerate downward movement of the rear end of the carrier frame 30 away from the roof flange 18. Simultaneous with collapse of the lifter link 76, the ramp member 92 connected therewith via the connecting rod 96 is withdrawn from support of the roller 88 so that the roller 88 is lowered along the inclined surface 106 into the track 38. Accordingly, the forward end of the carrier frame 30 is also lowered away from the roof flange 18. Continued rearward movement of the drive cable 84 tows the carrier frame rearwardly beneath the roof structure to completely open the roof opening 16.

During closing movement of the sunroof closure, the forward movement of the drive cable 84 from the position of FIG. 3 causes the roller 88 to engage the stop member 112 and thereby stop further forward movement of the roller 88 and the carrier frame 30. The forward end of the lifter link 76 is simultaneously stopped from further forward movement because it is connected to the closure panel by the pivot 78. A further forward driving movement of the drive cable 84 and the connecting rod 96 attached thereto forces the trailing end of the lifter link 76 to the upstanding position of FIG. 1. The ramp member 92 is simultaneously driven beneath the roller 88 so that the roller 88 rides up the inclined surface 106 and then dwells on the dwell surface 108. Accordingly, the outer peripheral seal portion 42 is reestablished in sealing engagement between the roof flange 18 and the carrier frame 30 all around the roof opening 16.

A further and more detailed discussion of the manner in which the roller 88, ramp member 92 and lifter link 76 cooperate to operate the sunroof closure may be had by reference to U.S. Pat. No. 3,981,531, issued Sept. 21, 1976 to Koral et al.

While this invention has been disclosed primarily in terms of the specific embodiment shown in the drawings, it is not intended to be limited thereto but rather only to the extent set forth in the appended claims. For example, while the preferred embodiment shown herein utilizes a toggle linkage 48 to move the closure panel 22 between the closed and angularly opened positions, it will be understood that a jack screw or equivalent mechanism may be utilized to operate the closure panel. Furthermore, it will be understood that the preferred arrangement of the seal 36 as shown herein may be replaced by other configurations of vertically compressible seals. Furthermore, it will be understood that the perimeter channel 26 may not be necessary or desirable for the glass panel 24 in some applications of the invention and that the glass panel could be replaced by an opaque panel of plastic or metal construction.

The embodiments of the invention in which an exclusive property or privilege is claimed are defined as follows:

1. A vehicle body sunroof comprising:
   a roof panel having a roof opening;
   a closure panel carrier frame adapted to sealingly mate with the roof panel and having a sunroof opening therein;
   carriage means acting between the vehicle body and the carrier frame and adapted to move the carrier frame between a normal closed position sealingly mating with the roof panel to close the roof opening and an open position in which the carrier frame is withdrawn from sealingly mating with the roof panel and stored longitudinally of the roof opening to open the roof opening;
   a closure panel adapted to sealingly mate with the carrier frame to close the sunroof opening;
   hinge means mounting the closure panel on the carrier frame for pivotal movement between a closed position sealingly mating with the carrier frame and a pivotally raised open position;
   and means acting between the closure panel and the carrier frame to effect pivotal movement of the closure panel between open and closed positions.

2. A vehicle body sunroof comprising:
   a roof panel having a roof opening defined by a downward facing portion;
   a glass panel having an outer portion of slightly smaller size than the roof opening;
   a carrier frame adapted to extend around the roof opening and underlie both the downward facing portion and outer portion of the glass panel, said carrier frame having a central sunroof opening therein;
   a seal mounted on the carrier frame and having an outer peripheral portion adapted for vertically compressive engagement between the carrier frame and the downward facing portion and an inner peripheral portion adapted for vertically compressive sealing engagement between the outer portion of the glass panel and the carrier frame;
   hinge means mounting the glass panel on the carrier frame for pivotal movement between a closed position vertically compressing the seal and a pivotally raised open position;
   means acting between the closure panel and the carrier frame to effect pivotal movement of the glass panel between open and closed positions;
   and operating means acting between the vehicle body and the carrier frame and adapted to move the carrier frame between a normal closed position vertically compressing the seal between the carrier frame and the downward facing portion and an open position in which the carrier frame is withdrawn from sealing with the seal stored longitudinally of the roof opening to open the roof opening.

3. A vehicle body sunroof comprising:
   a roof panel having a roof opening defined by a downwardly facing flange;
   a rectangular carrier frame having an outer peripheral edge portion adapted to underlie the downward facing body flange and an inner peripheral edge portion defining an opening in the carrier frame;
   first seal means carried by the outer peripheral edge portion of the carrier frame and adapted for sealing engagement with the downward facing body flange;
   carriage means acting between the vehicle body and the carrier frame and adapted to move the carrier frame between a vertically raised closed position in sealing engagement with the downward facing body flange and a vertically lowered position spaced away from sealing engagement with the downward facing body flange, and a stored position moved longitudinally of the roof opening to open the roof opening for open air communication with the outdoors;
   a closure panel having a peripheral edge portion adapted to overlie the inner peripheral edge portion of the carrier frame;
   second seal means carried by the inner peripheral edge portion of the carrier frame and adapted for sealing engagement with the closure panel;
   hinge means acting between one end of the closure panel and the carrier frame;
   and means acting between the closure panel and the carrier frame adapted to pivot the closure panel about the hinge and to retain the closure panel in a pivotally raised ventilator position permitting airflow communication with the outdoors.

4. A vehicle body sunroof comprising:
   a roof panel having a roof opening defined by a downward facing portion;
   a closure panel having an outer portion of slightly smaller size than the roof opening;
   a carrier frame adapted to extend around the roof opening and underlie both the downward facing portion and outer portion of the closure panel, said carrier frame having a central sunroof opening therein;
   a seal mounted on the carrier frame and having an outer peripheral portion adapted for vertically compressive engagement between the carrier frame and the downward facing portion of the roof panel and an inner peripheral portion adapted for vertically compressive sealing engagement between the outer portion of the closure panel and the carrier frame;

hinge means mounting one end of the closure panel on the carrier frame for pivotal movement between a closed position vertically compressing the seal and a pivotally raised open position;

toggle linkage means acting between the closure panel and the carrier frame to effect pivotal movement of the glass panel between open and closed positions, said toggle linkage having a first overcenter position holding the closure panel in the open position and a second overcenter position latching the closure panel in the closed position to vertically compress the inner peripheral seal portion between this closure panel and the carrier frame;

and operating means acting between the vehicle body and the carrier frame and adapted to move the carrier frame between a normal closed position vertically compressing the seal between the carrier flows and the downward facing portion and an open position in which the carrier frame is withdrawn vertically from sealing with the downward facing portion of the roof and stored longitudinally of the roof opening to open the roof opening.

* * * * *